(No Model.)
C. H. MOORE.
WASHBASIN FIXTURE.
No. 559,188. Patented Apr. 28, 1896.
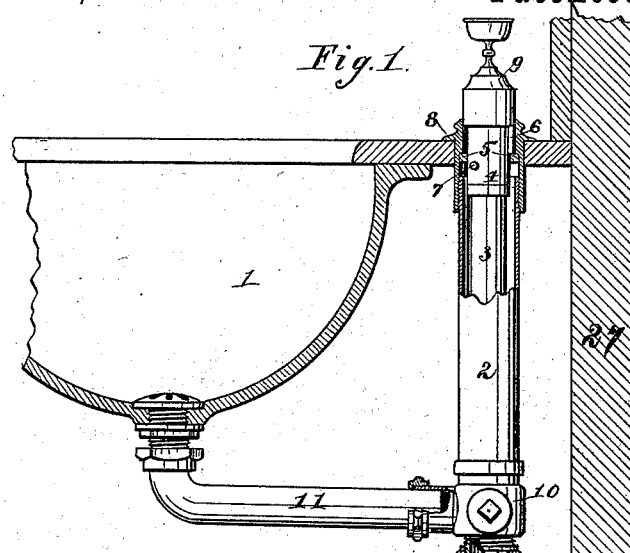
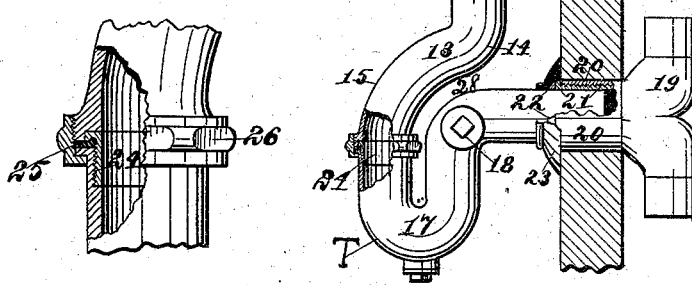
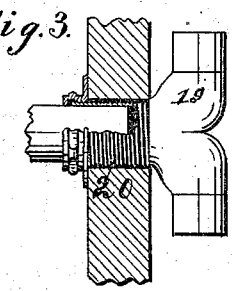
WITNESSES:
B. A. Chamberlin.
P. Hughes
INVENTOR
C. H. Moore

UNITED STATES PATENT OFFICE.

CHARLES H. MOORE, OF YONKERS, NEW YORK.

WASHBASIN-FIXTURE.

SPECIFICATION forming part of Letters Patent No. 559,188, dated April 28, 1896.

Application filed January 25, 1894. Serial No. 497,953. (No model.)

*To all whom it may concern:*

Be it known that I, CHARLES H. MOORE, a citizen of the United States, residing at Yonkers, in the county of Westchester and State of New York, have invented a new Washbasin-Fixture, of which the following is a specification.

My invention relates to traps and combined traps and wastes exclusively for washbasins; and its novelty consists in the construction and adaptation of the parts more fully hereinafter pointed out.

Before my invention it has, of necessity, on account of the narrow space between the back of the basin-hole and the wall, been the usual custom in setting washbasin-fixtures of the character shown herein to place the U-shaped part of the trap with the horizontal outlet running either to the right or left from the center of the fixture and then enter the wall with a ninety-degree bend or elbow. This has always been objectionable, first, as it requires the use of an elbow to enter the wall, which is an additional expense and requires more fitting; second, it tends to obstruct the free discharge of the waste water, which is the cause of the accumulation of filth in the waste-pipe; third, it is always somewhat in the way of one or the other of the supply-pipes leading to one of the basin-cocks; fourth, where two supply-pipes are brought vertically down from the basin-cocks the nickel-plated exposed pipes which it is now the custom of using on fine work do not look uniform when the discharge end of the trap enters the wall behind one of the supply-pipes, or approximately so; and the main object of my invention is to overcome this objection and make a trap formed in a U shape at the water-retaining section, with the tube-shaped inlet end curved in and over the top of the discharge end of the trap, so as to allow the said U-shaped trap to be connected to a fixture, as shown herein, and close to the wall and have the discharge end enter the wall on a direct line back from the center of the outlet of the basin and midway between the two vertical supply-pipes usually used in connection with such fixtures.

It is also my object to have the curved section a movable member, so that it can be turned either to the right or left, or at any angle, without altering the position of the U-shaped or lower part of the trap.

It is likewise my object to cheapen and simplify the work.

It frequently happens when the waste-pipe is being put in place that the receiving-branch for the discharge end of the trap comes against an iron girder, which prevents the workman from setting it on a line with the center line of the basin, and it also frequently happens when the best calculations are made in setting the receiving-branch for the trap that by some slight miscalculation in the length of the slab, or in cutting the basin-hole, or in the thickness of the partition, the center of the outlet of the basin or basin-waste is thrown to one side from the center of the receiving-branch (for the trap) that has been permanently set. It is to overcome this obstacle that I place the union-joint between the double curvature or offset and the U-shaped water-retaining section of the trap. The trap is expressly adapted for basins having a waste and overflow cylinder between the outside of the basin and the slab-back and wall, or for basins having the outlet at the back.

In the accompanying drawings, Figure 1 represents a side view of my invention. Fig. 2 represents a section of the trap. Fig. 3 shows a modified form of the trap connection. Fig. 4 shows the ring of the basin-waste.

1 shows a washbasin.

2 shows a basin-waste.

3 is an overflow-valve in the basin-waste cylinder.

4 is the upper section or pull to which the overflow-valve is adjusted.

5 is a ring-flange in the top fitting 8 of the basin-waste.

6 shows a guide and rest for the pull and overflow valve when the overflow-valve is seated. This guide 6 is in the ring 5.

To empty the basin the pull is lifted by the handle and turned and the guide 6 will then rest upon the ring-flange 5 and keep the overflow-valve up and open. To close the valve, in order to retain water in the basin, the pull is turned until the guide 6 falls into the groove *a*.

7 shows a pin that strikes the under side of the ring-flange 5 when the pull is being lifted and prevents it coming up beyond a desired height; but this pin is made small enough to pass through the groove a, and by turning the pull 4 far enough around it will come in contact with the groove a and the overflow-valve can then be lifted from the basin-waste cylinder.

8 shows a flanged upper section of the basin-waste, having a grooved ring-flange 5 made or secured in it far enough from the top to permit the overflow-valve 3 to be lifted from its seat until the water will empty from the basin and without exposing the small portion of the pull 4 on which the guide 6 is shown. The upper part 9 of the pull 4 is made about the size of the upper section 8 of the basin-waste, so as to operate freely within it, and the lower part is made enough smaller to operate within the ring-flange 5. The guide 6 projects out to the largest or upper section of the pull.

9 is the upper section of the pull 4.

10 shows the outlet-valve chamber, having a threaded cap on it to provide access to the valve-seat in order to remove any obstruction.

11 is a tube connecting the basin with the basin-waste.

12 is a coupling connecting the basin-waste with the trap, the tube of which extends down into the inlet end of the trap, so that the length of the trap may be varied in a vertical direction.

13 is the upper section of the trap, curved at 14 and 15, so that a plane passed vertically through its center line may be set at any angle to the wall.

16 is a nut to connect the swivel 12 with the trap.

17 is the lower section of the trap T, which is adapted to retain the water which prevents the escape of gases from the sewer.

18 is a cap at the discharge side of the trap T, which when removed will allow a flexible rod to be pushed into the vent or waste pipes.

19 is a vent and waste fitting, having a divided back section, so as to direct the discharging water down and prevent it from spattering up into the upper section or ventilating-pipe, as it would if the back of the said fitting 19 was flat. The divided back also acts as a guide in pushing a flexible rod either into the vent or waste pipes.

20 is the threaded inlet of the fitting 19, and 21 is a threaded bushing adapted to receive the discharge end of the trap T and to be soldered or otherwise secured thereto. 22 represents such a solder-joint. When it is desirable not to use the threaded bushing 21, the end of the trap is entered into the inlet 20 and secured with a threaded nut.

23 is a plate or escutcheon designed to cover the hole in the wall 27 and present a neat appearance.

24 shows a flanged ring screwed in the trap to hold the washer 25 in place and also act as a guide in putting the section 13 to the section 17.

26 is a horizontal union-coupling nut adapted to connect the section 13 to the section 17. The section 13 and connecting-nut is put on the inlet side of the trap, so that if the inlet 20 of the fitting 19 should enter through the wall on either side of the center of the basin or basin-waste this section 13 can be turned to meet and connect to the discharge end of the basin or basin-waste without disturbing the position of the U-shaped water-retaining section of the trap. The discharge side or end of the trap begins in the center of the U-shaped section 17 and extends to the fitting 19.

The advantages are, first, the movable curved member on the inlet side of the trap allows the inlet-coupling to be moved either to the right or left from the center of the trap without disturbing the water-retaining section 17 of the said trap; second, it affords an opportunity of putting the discharge end of a tube-formed U-shaped trap through a hole in a vertical wall on a direct line back from the center of the outlet of the basin and basin-waste and to connect the inlet end of the trap to the discharge end of a basin-waste located directly above the discharge side of the trap; third, by having the movable member on the inlet side of the trap if the horizontal union-coupling should leak sewer-gas could not escape from that source; fourth, in connecting a trap directly under a basin to a waste and vent fitting behind a vertical wall it requires less joints and less fitting and it is cheaper than the old plan.

Having described my invention, what I claim as new, and desire to secure by Letters Patent, is—

1. In a trap or fixture having a lower section, and an upper movable section curved in and over the discharge end of the trap, and adapted to be turned in either direction without moving the position of the water-retaining section of the said trap, a joint on the inlet side of the trap between the curved upper section and the lower water-retaining section, and a horizontal union-coupling to tighten the joint when the upper curved section is turned in any position, as and for the purpose set forth.

2. The combination with the lower water-retaining section of a trap, with an upper movable double-curved section adapted to revolve around the center line of that member of the lower section to which it is connected without altering the position of the lower or water-retaining section, and a coupling to tighten the two sections together when the upper section is at any position, and a coupling-nut 16 and tube 12 whereby the trap can be lengthened in a vertical direction.

3. The combination with a trap having a lower water-retaining section stationary with the discharge end and a horizontal outlet, of the double-curved inlet end of the trap arranged to be adjusted in a horizontal direction without altering the position of the water-retaining section of the trap, as and for the purpose set forth.

4. In combination, a trap having a stationary water-retaining section, and an upper movable double-curved section arranged to be adjusted in a horizontal direction without altering the position of the water-retaining section, and three coupling-nuts and a tube 12 on the inlet side of the trap, two of the coupling-nuts being on the vertical line above the top curve, for the purpose of securing the tube 12 to the inlet end of the trap and to the basin-waste, and one of them being for the purpose of securing the double-curved upper section to the stationary water-retaining section.

5. The combination with a washbasin-trap having four curves, of a horizontal union-coupling nut between the two upper curves and the two lower curves, and arranged to admit of the two upper curves being turned in a horizontal direction without altering the position of the two lower curves, and to tighten the two sections together when the two upper curves are in any position, as and for the purpose set forth.

6. The combination with the basin-waste 2, having the outlet-valve 10 perpendicular over the discharge end of the trap, of the upper double-curved inlet side of the trap arranged to be adjusted in a horizontal direction without altering the position of the water-retaining section of the said trap, a tube 12 arranged to lengthen the inlet end of the trap in a vertical direction, and a horizontal coupling-nut 26 to connect the upper curved section with the water-retaining section and arranged so that the two sections can be disconnected without having to remove the upper section from the basin-waste 2, as and for the purpose set forth.

CHARLES H. MOORE.

Witnesses:
P. HUGHES,
H. MILLS.